United States Patent [19]

McGahee

[11] Patent Number: 4,841,665

[45] Date of Patent: Jun. 27, 1989

[54] COUPLING MEANS FOR SECURING PLASTIC WORMS TO FISH HOOKS

[75] Inventor: Welbourne D. McGahee, Melbourne, Fla.

[73] Assignee: Loop-a-Line, Inc., Melbourne, Fla.

[21] Appl. No.: 238,490

[22] Filed: Aug. 31, 1988

[51] Int. Cl.⁴ .............................................. A01K 85/00
[52] U.S. Cl. .................................. 43/42.24; 43/42.25; 43/42.52
[58] Field of Search ..................... 43/42.24, 43.4, 44.2, 43/44.4, 44.8, 44.86, 42.37, 42.38, 42.39, 42.29

[56] References Cited

U.S. PATENT DOCUMENTS

| | | | |
|---|---|---|---|
| 2,482,721 | 9/1949 | Sigmundi | 43/44.2 |
| 3,778,920 | 12/1973 | Anton et al. | 43/44.4 |
| 3,978,606 | 9/1976 | Riggs | 43/42.37 |
| 4,244,133 | 1/1981 | Martinek | 43/42.37 |
| 4,334,381 | 6/1982 | Carver et al. | |
| 4,765,086 | 8/1988 | Schültz | |

Primary Examiner—Nicholas P. Godici
Assistant Examiner—Michael William Starkweather
Attorney, Agent, or Firm—Harold Gell

[57] ABSTRACT

A bait securing means comprised of a helical wire coil including a means for securing one end of the helix to a fish hook eye by snap fit deformation of the wire. The dimension of the helix is calculated to allow the shank of a hook to pass coaxially through the coils and to permit a bait such as an artificial worm to be screwed onto the unsecured end of the helix so the helix will be completely enclosed within the end of the bait and a web of bait material greater than the diameter of the wire is present between the coils of the helix.

24 Claims, 4 Drawing Sheets

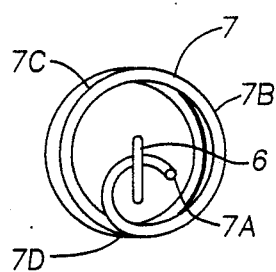
FIG. 7
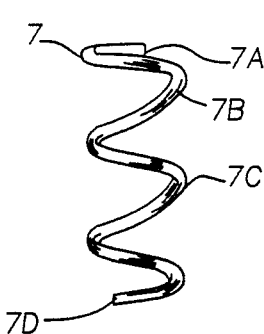
FIG. 8
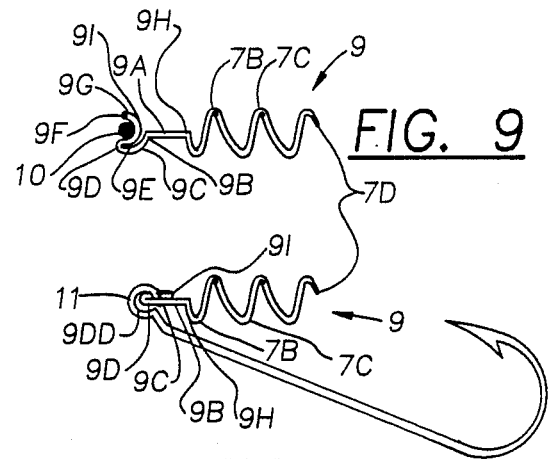
FIG. 9
FIG. 10
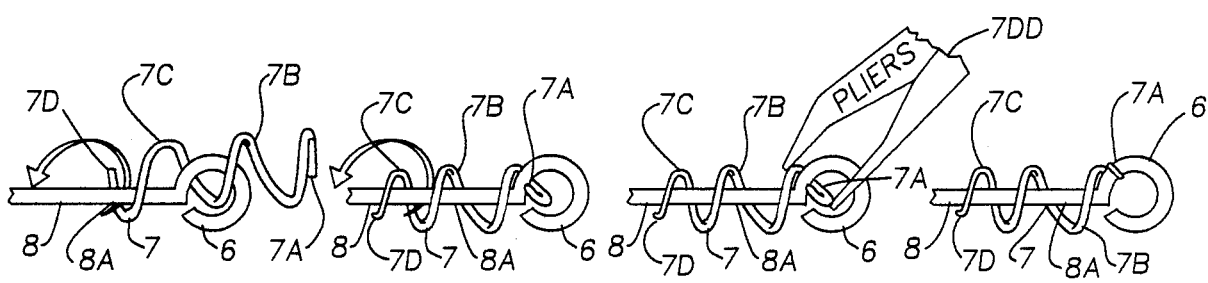
FIG. 11　　FIG. 12　　FIG. 13　　FIG. 14
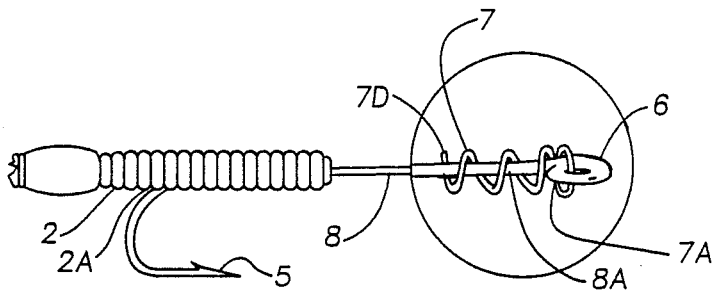
FIG. 15　　FIG. 15A
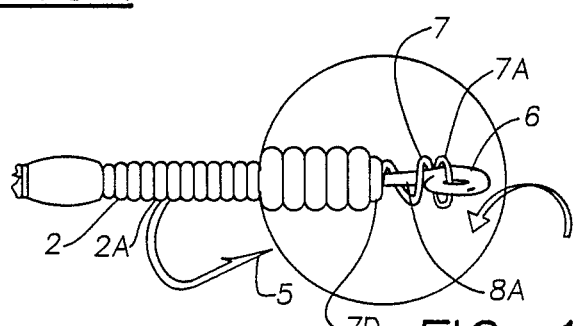
FIG. 16　　FIG. 16A

COUPLING MEANS FOR SECURING PLASTIC WORMS TO FISH HOOKS

FIELD OF THE INVENTION

The present invention is directed to a means for securing bait, including artificial plastic worms to fish hooks.

BACKGROUND OF THE INVENTION

Plastic worms are one of the most popular artificial fishing lures. They normally have elongated bodies formed of an extremely flexible, soft plastic of almost jelly-like consistency. They are used by threading them on fish hooks. The usual mode of applying a plastic worm to a hook is to insert the hook point into the nose of the worm and out at a point spaced from the nose a distance approximately equal to the length of the hook shaft. The impaled portion of the worm is slid around the throat of the hook and up the shank until the nose covers the hook eye. The hook point and a major portion of the curved section of the shank are then exposed exteriorly of the lure and will be snagged in underwater vegetation and trash when the hook is drawn through the water during fishing. To prevent this, it is a common practice to reinsert the point of the hook into, but not through, the worm body at the point of the worm lying opposite the point of the hook. The worm body itself then acts as a "weed guard," preventing the hook from being snagged by underwater vegetation and trash. This is often called "Texas Style" fishing. When a fish strikes, usually completely engulfing the hook in its mouth, the hook point is forced on through the worm body to be set in the fish's mouth, as permitted by the elastic stretch of the worm between the hook point and the hook eye, this being the section of the worm which previously served as a weed guard.

The practice outlined above is subject to certain difficulties and common malfunctions arising from the fact that it is difficult to fasten the worm body to the hook shank adjacent the eye with sufficient security to prevent slippage. The worm is very soft and has a virtually "self-lubricating" quality, so it slides freely on the shank of the hook. As a consequence, when a fish strikes, it often pulls the worm section embedded on the shank of the hook along the shank toward the point of the hook, causing the "weed guard" portion of the worm to be bunched or "wadded" into the throat of the hook, the bulk of this wadded section of the worm often fills the throat of the hook and actually shields the point so that it does not protrude from the worm, far enough only to slightly be properly set in the fish's mouth. Even when a fish does not strike, the bunching or wadding of the weed guard section of the worm in the throat of the hook often occurs when fishing in heavy underwater brush. The vegetation wadding the worm into the throat of the hook with the result that the hook cannot be set properly when a fish does bit. Furthermore, the user must rearrange the worm when he retrieves the lure for another cast. Various means for fastening the worm more securely to the hook shank have been proposed, such as forming barbs or lateral offsets in the hook, but none have been satisfactorily effective.

Early attempts to solve the preceding problem included the concept of forming barbs in the upper end of the hook shank right below the hook eye. The theory behind this adaptation was to provide a means to hold the head of the plastic worm in position. Unfortunately, the dimensions of the barbs are a function of the diameter of the hook shank and therefore are relatively small and do not create enough bite to hold a plastic lure such as a worm in place. R. Carver et al in U.S. Pat. No. 4,344,381 on "Fish Hook And Worm Lure Combination" attempted to solve this problem by providing an auxiliary shaft with barbs. This system had various shortcomings. For instance, this partially successful attempt to alleviate the problem of fastening baits to hooks has been provided by R. Carver et al in U.S. Pat. No. 4,334,381 on "Fish Hook And Worm Lure Combination" issued June 15, 1982. This device utilizes a barbed shaft secured to a hook eye and adapted to be forced into the nose end of a bait such as an artificial worm. Unfortunately, the barbed shaft interferes with the functioning of the hook during hook setting operations and is subject to being easily pulled off the hook and shaft combination in the event of a strike which does not completely engulf the bait.

R. Riggs, U.S. Pat. No. 3,978,606 on "Fish Hook and Worm Lure Combination" issued Sept. 7, 1976 attempted to solve the barbed shaft problem by providing a helical spring-like screw on the eye end of a hook so that the worm could be threaded onto the helix and held in place. Unfortunately, this attempt to solve the problem is far from satisfactory because the helix is welded to the shaft of the hook at the side closest to the barb rather than the eye so that it is impossible to thread a plastic worm onto the hook and then screw it up onto the helix. The worm has to be threaded on from the eye side and because of the dimensions of the helix and the fact that the smaller end opposite from where you must begin threading is welded to the shank of the hook, the device acts as a cover and simply cuts a section out of the plastic bait. Furthermore, a device such as that suggested by Riggs is costly to manufacture in that the hook has to be annealed and rust proofed after the welding operation. Even with special treatment, the weld point of the helix attachment site is a weak link in the hook and subject to failure if a fish strikes.

M. Martinek, U.S. Pat. No. 4,244,133 on "Barbed Fishing Lure With Pivoted Spring Means For Attaching A Plastic Worm Thereto" issued Jan. 13, 1981 is an improvement over the Carver device in that the barbed shaft is replaced by a wire spring adapted to be secured to the hook eye and threaded into the nose end of the bait. According to the teachings of Martinek, the shaft of the hook has to be bent to form a section approximately 90 degrees from the main hook shaft which supports the eye so that the artificial worm or similar bait may be screwed onto the wire up to but not including the eye without being deformed by the major length of the hook shank.

In Martinek, the eye of the corkscrew is closed into the closed eye of the fish hook. Thus, when a fish hits the rigged worm, the worm must be stretched until the point of the hook sticks through the worm before hook point can be set in the fish's mouth.

A major problem with devices constructed according to Martinek is that the tightly or closely coiled (see Column 2 Lines 53 et seq of U.S. Pat. No. 4,244,133) section of the spring cuts a core out of the bait as it is threaded on and as the result, the bait is easily pulled from the securing means.

Two critical and fatal flaws exists in the Martinek design. The tightly coiled section of the spring or the sharply bent hooked shank prevent the spring from being coiled about the hook shank and thus the bait cannot be threaded over the hook shank. This is a serious fault of such devices because the inability to thread the bait over the shaft significantly reduces the effectiveness of the bait. For instance, in Martinek, the fish feels the uncovered hook shank while the barb is still covered and usually spits out the obviously inedible and unpleasant feeling object. Irrespective of any other deficiencies of the device, this alone renders it impossible and unusable for effective fishing as witnessed by its obvious lack of commercial success.

OBJECTIVES OF THE INVENTION

It is a primary purpose of the present invention to provide a bait securing means in the form of a helical spring which may be threaded over a shank and secured to the hook eye by a simple snapping operation of a spring biased wire configuration which will permit an artificial bait to be threaded over the barb of a hook and up the shank and screwed onto the bait holding helix.

A further objective of this invention is to provide new and useful methods of securing all types of plastic worms and artificial baits and pork rinds, etc., to fish hooks.

Another objective is to present means for attaching a helix or spring means to a hook eye where no changes or modifications are required of either the hook or artificial bait to be secured by the spring or helix.

Another objective is to make fishing with plastic worms less costly by providing a means to rig a plastic bait such as a worm to render the hook/bait combination weed less.

A still further objective is to provide an artificial bait securing helix which is screwed on the hook's eye and the helix is then, while still inside the hook's eye, transposed around the hook shank and the last coil of the helix is then bent with a pair of pliers onto the hook eye to permanently secure the helix to the hook.

Another objective is to provide a means for securing a bait holding helix to a hook's eye by forming the last coil of the helix so that it can be rotated onto the hook easily but can't be removed unless the coil is forced open. This allows relatively easy installation of the helix onto the hook and yet still allows removal by the user so that it can be used on another hook if desired.

A still further objective of the present invention is to provide a means whereby anyone with a pair of pliers can secure the bait holding helix to a hook in seconds.

Another object is the provision of a means for securing a helical formation of wire to a fish hook's eye, whereby the fisherperson can acquire a hook from one source and a plastic worm from another source, and join the coil spring helix of the present invention to the hook.

Another objective is to securely anchor a worm to a hook with a very soft, spring wire helix which functions as a shock absorber to keep the worm from being torn when the fish strikes.

Another objective of the invention is to overcome the problems of securing a spring coil helix to a hook.

Another objective is to create a break-away type of securing helix for a worm to allow the entire worm to be kept out of the way of the hook's point.

Another objective is to provide a means to secure baits to hooks which enables one to screw the plastic material completely over the hook eye and out onto the fishing line 1.

Another objective is to provide an easy on/easy off connection for a bait securing helix coil's attachment to a hook's eye. Thereby making it (1) easier to attach at the factory, (2) easier for the fisherperson to assemble the helix to a hook eye, and (3) a quick means of disassembling the helix when desired for quick change to another type plastic lure combination.

Another objective is to shorten the overall length of a bait securing helix and its connecting means to a hook's eye.

Another objective is to provide a bait securing helix shortened by two thirds over other connectors for a given type of hook, thereby decreasing the metal in the way of a fish's striking zone and increasing the chances of a fish getting hooked on hook point.

Another objective is to overcome the problem of the hook point 5 pulling through the worm body 2 before the fisherperson has a fish biting.

SUMMARY OF THE INVENTION

With the bait connectors in use today, the chances of setting the hook point a fish's mouth is decreased due primarily to the connector's length. The very short distance of plastic lure material that exists between the end of presently used connectors and the hook point makes it difficult for a striking fish's mouth to cause the hook point to penetrate the plastic lure material and enter it's mouth.

By decreasing the length of the connector, the length of plastic lure material is increased and more flexibility is allowed to the bait or worm, making it easier to depress the plastic lure material to a point where the hook point is exposed through the worm to engage the fish's mouth.

With a shortened connector, the strike of a fish causes the plastic material to be moved off the hook point instead of forcing the hook point through the plastic lure material, thereby exposing the hook's point at the first moment of the fish's strike, allowing for more hook ups.

The same action that used to pull the plastic lure material down the hook's shank when small slices or barbs were used to retain the lure material now pulls the lure material completely off the hook's point, thereby helping to hook the fish.

The bait or worm must have movement on the hook shank for the hook point to be able to pull through the worm body. Practical testing proved that the length a hook point pulled through a worm body is proportional to the movement of the worm down the hook's shank. With the present spring coil helix device attached to a hook eye and firmly securing a worm's head against movement down the hook shank, when a fish bites on the hook and worm, the force of the fish biting makes the plastic worm lure pull off the hook point instead of forcing the point of the hook through the worm's body. The worm is no longer stretched between the hook's eye and the point of the hook. The hook point pulls through the worm lure body only when the worm is pulled by the portion of the worm past the hook's curved section.

In prior devices the movement of the worm down the hook's shank allowed the pull on the tail section of the worm to pull the hook point through the worm body. With the worm secured against movement down from the hook eye by the helix of this invention, the only movement allowed on the worm is an upwards movement that pulls the worm away from the hook point, thereby allowing quick setting of the exposed hook point into the fish. The pull of the worm's tail when retrieving the worm as the material passes over the limbs, trash, rocks and water growth items, will cause enough friction to sometimes break the worm in two at the hook's curve—but because the worm cannot move down the hook's shank, the point cannot be pulled through the worm body, and it remains weedless.

In tournaments, some people lose as many as 75 worms per day from worms wadding as casts are made. As the weight of sinkers is increased to achieve either distance, or to make the worm lure drop quicker, such as in a "flipping" type fishing, on the cast, the rigged worm hurtles rearward, then a rapid deceleration takes places as the rod whips forward. The worm lure starts away from the caster and at this point of casting wadding of the worm lure takes place. This invention solves this casting failure.

DESCRIPTION OF THE FIGURES

FIG. 7 is a top view of the spring wire helix bait securing device of the invention.

FIG. 8 is a side view of the spring wire helix bait securing device of the invention.

FIG. 9 is a top view of FIG. 10 and is rotated 90 degrees and illustrating the hook eye wire in cross section. In this mode the helix coils do not encompass the hook shank.

FIG. 10 illustrates the invention secured to a hook eye in a mode wherein the helix coils do not encompass the hook shank.

FIG. 11 illustrates how the spring coil helix device is inserted into a hook eye and rotated around a hook shank.

FIG. 12 illustrates where the spring coil helix device must be stopped in order to bend the last coil into the hook eye.

FIG. 13 shows the spring coil helix device in the same position as FIG. 12, with a pliers ready to close the last coil into the hook eye.

FIG. 14 illustrates the completed assembly of the hook and helix device.

FIG. 15 illustrates the first step in securing a plastic worm lure to a hook via a helix securing device.

FIG. 15A is an enlargement of the helix of FIG. 15.

FIG. 16 shows the plastic worm material moved up the hook shank to the start of the sharp point of the open, first coil of the helix bait securing device.

FIG. 16A is an enlargement of the helix portion of FIG. 16 with the sharp end of the helix device starting to be screwed into the plastic worm lure material.

DESCRIPTION OF THE INVENTION

Figure 1:
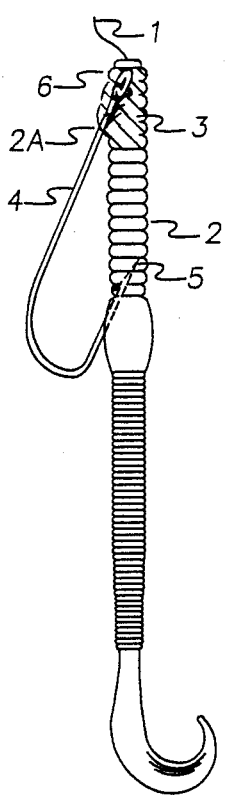
FIG. 1 illustrates a fish hook with a prior art bait holding barbed shank to hold a plastic worm lure. The hook is a bent type hook such as manufactured by Tru Turn Hook Company, Inc., under U.S. Pat. No. 4,214,398.
Figure 2:
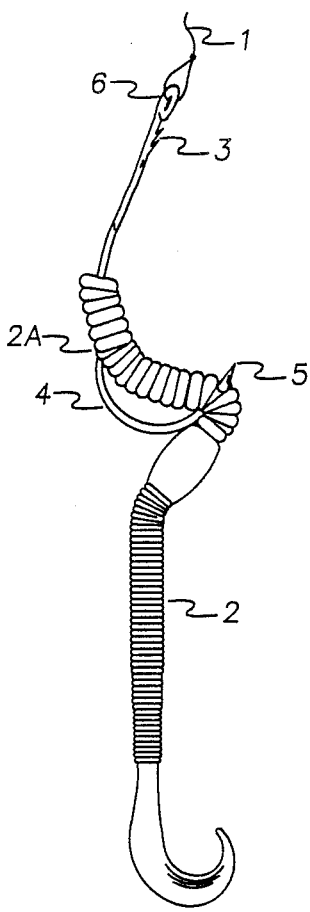
FIG. 2 illustrates wadding which results when the prior art barb or slices fail to hold the worm securely. Note the exposed hook point.

In the figures, like reference designation numbers apply to similar parts throughout the several views. Reference designator number 4 is a bent fish hook of the type produced by Tru Turn Co., Inc., under U.S. Pat. No. 4,214,398, and generally a fish hook of Tru Turn's design. Reference designator number 8 is a hook of standard design, consisting of a length of wire bent at one end to form an eye 6 into which fishing line, or leader, 1 is secured. It includes a shank portion which may be angled to produce a short section adjacent to the eye 6 and a longer section terminating after a re-entrant curve into a barb and point 5. The point and barb portion of the hook is approximately parallel to the longer shank section. A plastic worm lure of ordinary design is identified by the reference designator number 2. It consists of a slender, elongated body of flexible, elastic plastic material much longer than the fish hook itself. The anchoring means for securing the worm 2 to the fish hook 8 consists of a short length 7 of cylindrically wound helical spring coils formed of wire or inorganic or organic filaments that may be disposed in a coaxial relationship about the hook shank adjacent to the hook eye 6. The helix is fabricated from a material which will provide resiliency to give the device a shock absorbing quality calculated to ease sudden shock loads on the helix/bait interface to prevent tearing or cutting of the bait material by the helix and subsequent securement failure. This is accomplished by using a wire or filament which has a resiliency which results in the helix functioning as both a compression and expansion spring with a resistance to change approximately equal to the resistance to change of the bait material caused by its elasticity. This is a critical balance in the best mode of the invention because if the helix spring tension is soft, the helix will straighten out and pull free of the bait. If the spring tension is to stiff, the helix will cut the bait material and pull free by a coring action. A typical prior art device over which the present invention is a major improvement is illustrated in FIG. 1. A fishing line, 1 is secured to the hook eye 6 and a plastic worm lure, 2, is secured by slices in the hook shank metal at 2A which create barb like projections, 3 on the hook shank. The barbs 3 are supposed to hold the worm 2 in place. However, the barbs are small and the plastic weak. This results in wadding as illustrated in FIG. 2 when the barbs 3 fail to hold the plastic worm in place.

Figure 3:
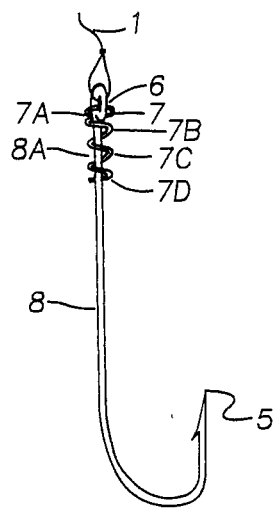
FIG. 3 illustrates a standard fish hook with the present invention in place on the hook.

Wadding as the result of barb failure is eliminated by the securing means of the present invention of which FIG. 3 illustrates a typical embodiment wherein 1 is the fishing line, 5 is the hook point, 6 is the hook eye, and 7 is the coil spring helix securing device of the present invention. The end wire coil 7 is closed about the hook wire forming the hook eye 6 to permanently fasten the helix to the hook eye. The next coil, 7B, is the first coil of the helix, 7C is the second coil, and 7D is the last coil. The last coil is open ended and terminated by a sharp end which screws into the bait. The coils of the helix are spaced apart as indicated at 8A by a distance which will preclude coring of the plastic as it is screwed on the helix.

Figure 4:
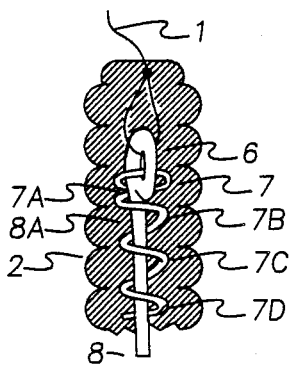
FIG. 4 is a phantom view of a hook with a helix device in place, securing a plastic worm lure to the hook.

FIG. 4 is a partial phantom view of a plastic worm lure 2 secured in place on the hook 8 by the helix securing means 7 of FIG. 3. Note the relatively large segment of plastic material at 8A which prevents tear-out and subsequent wadding.

Figure 5:
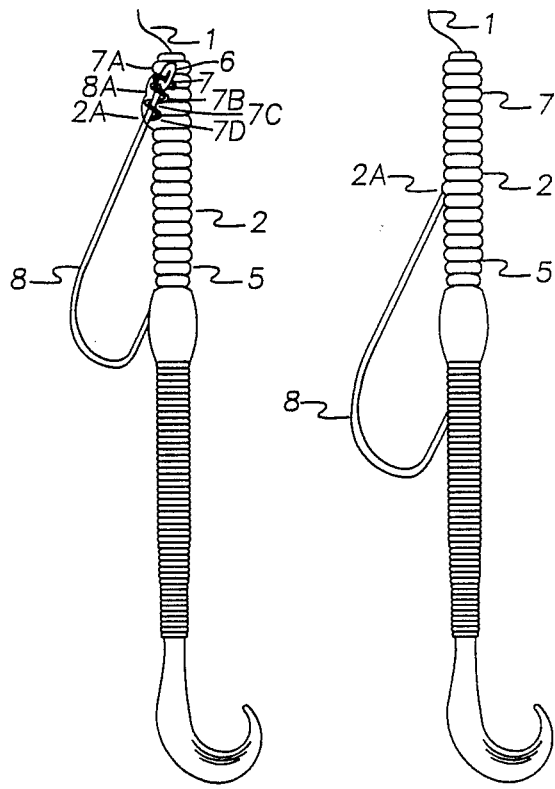
FIG. 5 is a phantom view of the spring wire helix device of the invention in place and securing a plastic worm lure on a hook. The worm covers the entire fish hook eye and the spring coil helix device fits all types of hooks, straight shank or bent.

In FIG. 5, the worm is portrayed in phantom over the helix to illustrate the difference between the prior art barb securing means of FIG. 1 and the helix 7 of the present invention.

Figure 6:
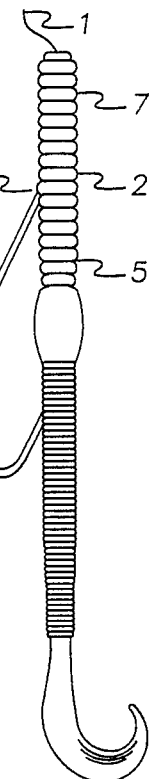
FIG. 6 illustrates a rigged plastic worm lure and hook ready to fish.

FIG. 6 illustrates an assembled plastic worm lure and hook with the helix covered by the worm body. In this figure as in all others, 1 is the fishing line and 2A is the point where the hook shank exits the plastic worm lure. In this figure, the hook point cannot be seen as the plastic worm is protecting the hook point, making the hook weedless.

FIG. 7 is top view and FIG. 8 is a side view of the spring device where 7 indicates the entire cylindrical helix, 7B is the first coil of the helix, 7A is the end coil which is bent around the hook eye 6. The last coil, 7D is open and has a sharp end which screws into the plastic worm material. 7C is second coil of the helix.

Figure 18:
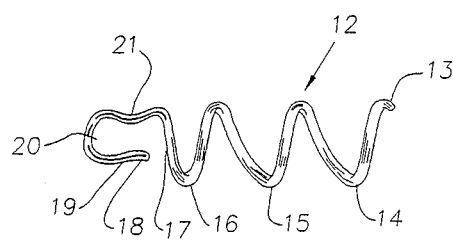
FIG. 18 depicts an EZ hold embodiment of the invention where: 12 is the entire device; 13 is the sharp end of the coil wire; 14 is the first coil; 15 is the second coil; 16 is the third coil; 17 is the space, or gap distance between coil 16 and end of wire 18 which acts as the first locking means to retain the helix 12 on the hook eye; 18 is the end of the wire; 19 is a curve in the wire that opposes and cooperates with section 21 to act as a spring biased snap retaining to hold the helix 12 on the hook eye 23 with out the need to bend the wire end around the hook eye wire; 20 is a curve in the wire that engages the hook eye wire.
Figure 19:
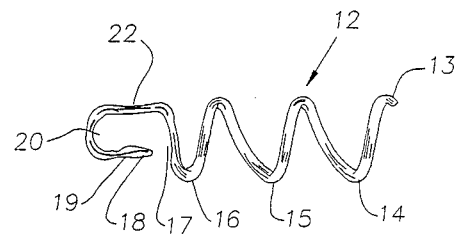
FIG. 19 is an alternate configuration for section 21 of FIG. 18 illustrating the use of a straight wire segment 22 as opposed to a bent segment.

FIG. 9 is a top view of a securing helix using a snap or break-away type fastening means such as illustrated in FIGS. 18 and 19 and explained in detail later on in this specification. In FIG. 9, 7B is the first coil, 7C is the second coil, and 7D is the last coil. The last coil has a sharp edge 9 which penetrates the plastic worm material to secure it. The sharp edge may be created by cutting the wire at an angle. 9H is a curved section next to 7B, the first coil of the helix, 9A a is straight portion of the wire which lays at right angles to the coils. 9B is a curved extension of 9A which leads into curve 9C. 9D is a double back bend paralleling curve 9C. 9DD is the outer portion of the curved bend 9D, as shown in FIG. 10. 9E is the upper curved portion connecting 9D to the end of the curved break-away portion 9G which is opposite the curved portion 9E. 9I is the center curved portion of 9G and 9E. 10 is a cutaway section of the hook eye wire shown in FIG. 10 as 11 in side view.

FIG. 10 is a side view of FIG. 9 and all numbers are the same, except for 11 and 9DD, the side view of the hook eye which is numbered 10 in FIG. 9. The space between 9F and the outer portion 9DD of the curved bend 9D allows for these parts to spring around the hook eye wire as shown in FIG. 9.

FIG. 11 illustrates the means whereby the coil spring helix bait securing device 7 is attached to the hook 8. Coil spring section 7D of helix 7 is inserted into the fish hook eye 6 by rotating the coil spring to allow coil spring section 7D to traverse from hook eye 6 to and around hook shank while coil section 7C moves into hook eye 6. As the rotation or screwing of the helix 7 continues, section 7A, the last coil, enters hook eye 6 as sections 7D, 7C and 7B travel around hook shank. When this position is reached, as in FIG. 12, a pair of pliers, represented at 7DD in Figure 13, may be used to close the last coil section 7A in to hook eye 6 as shown in FIG. 13 into the final position as shown in FIG. 14. The helix coil 7B is angled different than coils 7C and 7D. This creates a compensating bend coil section which keeps the helix from being held against the hook and thereby avoids coring or cutting of the plastic web which fills 8A when a worm is installed.

The compensating bend is formed by bending coil 7B slightly backwards toward the other coils of the spring. It forms a coupling section between helix coil 7C and the securing end 7A which is not within the plane of the last true coil of the helix. This different angle places the last or coupling coil in a different plane than the other coils to overcome a problem encountered in the early stages of development of the present invention. When the first models of the springs were made, all the coils were in the same plane. The inside of the spring coils were forced against the hook shank and this caused the spring to ream, core, or cut out the inner material of the plastic worm in the 8A region, thereby allowing the worm to pull free.

Coring is also prevented by spacing all adjacent coils from each other, as indicated at 8A, by a distance of at least the diameter of the wire forming the helix. In the preferred embodiment, the space between coils is approximately four times the diameter of the wire.

The spring device is free to move, or wobble about the hook shank. This wobble allows sharp end of coil 7D of the spring device to enter the plastic worm lure.

Figure 17:
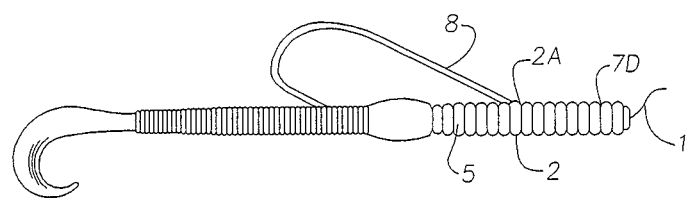
FIG. 17 illustrates the completed installation of the plastic worm material onto the spring coil helix bait securing device.

The plastic worm lure is attached in the following manner (see FIGS. 15 through 16A): The point 5 of the fish hook enters into the nose portion of the plastic worm lure and is forced therethrough exiting from the side of the worm lure at a point 2A spaced longitudinally apart from the point of entry by a distance somewhat greater than the length of shank of the hook. The portion of the impaled worm is slid along the hook towards hook eye 6, passing around the curved throat portion of the hook and up the hook shank to the beginning of the spring coil section sharp end 7d. The plastic worm lure is then rotated around the axis of the hook shank section while pressure is applied to force section 7D into plastic worm 2. This is continued until the head of the plastic worm lure 2 has been screwed up and over hook eye 6 and onto fishing line 1 as can be seen in FIGS. 6 and 17.

When fishing with a bait rigged as illustrated, the portion of the worm between the point where the fishing line 1 exits the worm and where hook point 5 enters the worm acts as a weed guard. When a fish bites, it usually takes the entire bait and hook inside of it's mouth. If the worm has torn loose and wadded as happens with prior securing means (FIG. 2), the hook point 5 doesn't protrude far enough to be set in the fish's mouth and the fish gets away. With the spring coil helix securing device of the present invention, the worm is held securely and cannot be pulled into a wad by casting or retrieving. So when the fish strikes, the worm is pulled away from the hook point 5 as the force to move the worm into a wad at the throat of the hook is reversed. The worm is moved in the opposite direction and the hook point 5 is totally exposed without anything to hinder point 5 from entering the fish's mouth.

FIG. 11 is instructions on how the spring coil device 7 is inserted into position on hook shank 8. 6 is hook eye, 7 is entire spring coil device, 7A is end of wire that is bent into place in hook eye 6. 7B is first coil of spring, 7C is second coil of spring, 7D is sharp end of wire spring which penetrates into plastic worm material. 8 is hook shank, 8A is area of hook shank 8 that the spring is around.

FIG. 12 is second step of instructions and shows where spring coil device must be stopped in order to bend last coil at 7A into hook eye 6. Note: All numbers in FIGS. 11, 12, 13 and 14 are the same.

FIG. 13 shows the spring coil device in the same positions as FIG. 12, the only difference is that 7DD is the pliers shown ready to close 7A and 7B into position around hook eye 6.

FIG. 14 shows the assembly of the hook and spring device complete.

FIG. 15 shows first step of securing worm to hook and spring device, 2A shows where point 5 comes out of worm.

FIG. 15A is an enlarged circle view showing the helix in place ready to be screwed into a plastic worm.

FIG. 16 shows plastic worm material moved up hook shank to the beginning area of 8A. 2A shows where point 5 comes out of worm.

FIG. 16A shows 7D of coil spring device starting to be screwed into the plastic worm lure material.

FIG. 17 shows the completed installation of the spring coil device into the plastic worm material.

An alternate means for securing the helix to a hook is illustrated in FIGS. 18 and 19 where the crimped or bent wire end is replaced with a formed spring clip which needs only to be snapped over the hook eye wire to secure the helix to the hook. Two different basic forms of the spring clip are illustrated in FIGS. 18 and 19. They are the spring clip formed by the end coil 16 of the helix and an adjacent wire section 18 and the U shaped clip 20. Either clip may be used or they both may be used as illustrated to provide a dual securing means.

In FIGS. 18 and 19, the space 17 between coil 16 and wire section 18 is smaller than the diameter of the hook eye wire but large enough to allow the hook eye 23 to be forced past coil 16 and wire section 18. The minimum dimension of space 17 is a function of the resiliency of the spring clip material, i.e., the stiffer the spring, the greater the minimum dimension. After the clip is forced open and the hook eye 23 passes through space 17, the space snaps closed relative to the hook eye wire diameter, to provide a first securing means that may be used independently or in combination with the U shaped clip as illustrated in FIGS. 18 and 19.

The U shaped clip 20 includes a bottom inside radius which is larger than the radius of the hook eye wire. The sides of the U, 19 and 21 of FIG. 18 or 19 and 22 of FIG. 19 create a restriction to the hook eye wire by being closer together at least one point than the diameter of the hook eye wire. The space formed by bends 19 and 21 of FIG. 18 or the bend 19 and straight section 22 of FIG. 19 create a second snap action securing means when the hook eye wire is forced past the restriction created by the facing curvatures of sides 19 and 21 or the curvature of side 19 and straight side 22. Either embodiment of the U shaped clip may be used alone or in combination with the clip including space 17 as illustrated in FIGS. 18 and 19. In the preferred embodiment, the closest distance between the two sides of the U is at the median of the side curvatures.

Figure 20:
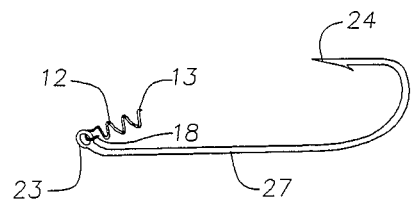
FIG. 20 illustrates a EZ hold spring wire helix bait securing device 12 on a hook 27 and attached to the hook eye 23 of a hook type shown in FIGS. 9, 10, 20, 21 and 22 where: 18 is the end of the securing device 12; 23 is the hook eye: and 24 is the hook point.

FIG. 20 illustrates the securing means illustrated in FIG. 18 or 19 snapped onto a bent shank hook.

Figure 22:
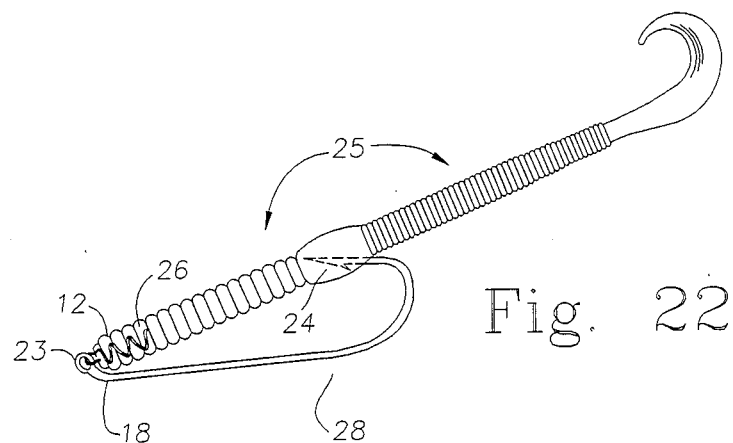
FIG. 22 illustrates an EZ hold spring wire helix bait securing device 12 attached to hook 28 of the type produced by Tru Turn, Inc., under U.S. Pat. No. 4,214,398. Area 26 is in phantom showing the helix 12 in place on the hook eye 23 with the worm 25 rotated around the securing helix 12. Hook point 24 is inserted into the worm body 25 to protect the hook point 24 and make the hook and lure combination weedless.
Figure 21:
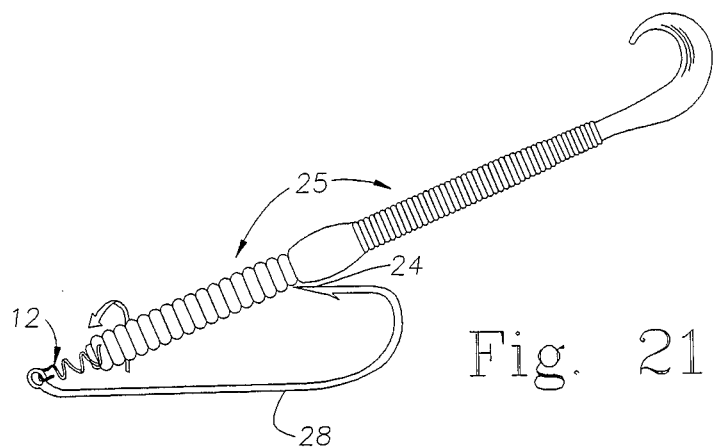
FIG. 21 illustrates a worm 25 being installed on a helix securing means 12 by rotating the worm or other plastic lure device onto the helix 12.

When the helix 12 is fastened, either by snap action or bending, to the hook eye 23 of a bent shank hook, the bait is attached as illustrated in FIGS. 21 and 22. In FIG. 21, the worm 25 is screwed onto the helix 12. This is accomplished by rotating the plastic lure material 25 in a manner which will cause the end of the helix coil wire (13 of FIG. 20) to penetrate the plastic lure material. Rotation is continued until the plastic lure material reaches the hook eye 23 as illustrated in FIG. 22. Hook point 24 is then inserted into plastic lure material 25 as seen in phantom in FIG. 22.

In FIG. 22 the EZ hold helix device 12 is attached to hook 28 which may be the type sold by Tru Turn, Inc., U.S. Pat. No. 4,214,398. Area 26 is phantom showing of connector 12 in place on the hook eye 23 with the worm 25 rotated around the helix connector 12. The hook point 24 has been inserted into worm body 25 to protect hook point 24 and make hook/lure combination weedless.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An apparatus for securing a lure to a hook, comprising:
   a cylindrical helix made of wire with all adjacent coils spaced apart by a uniform distance greater than the diameter of the forming wire;
   means for enabling said helix to be screwed into said lure, comprising an open termination of said helix created by an unattached end of said wire forming said helix; and
   means for securing said helix to the eye of said hook, said securing means including a bent termination of a section of said wire extending from the coupling end of said helix opposite said open termination of said helix.

2. An apparatus for securing a lure to a hook as defined in claim 1, further comprising:
   a transition section of wire between said bent termination and the beginning of the first coil of said helix, said transition section of wire formed to create a wire section not within the plane of the coils of said helix.

3. An apparatus for securing a lure to a hook as defined in claim 1, wherein the wire from which said helix is made has a resiliency which causes said helix to function as both a compression and expansion spring with a resistance to change calculated to absorb the shock of casting or a fish strike to preclude the elastic deformation of the bait material caused by said shocks from bearing against the wire of said helix with a cutting force.

4. An apparatus for securing a lure to a hook as defined in claim 1, wherein the wire from which said helix is made has a resiliency which causes said helix to function as both a compression and expansion spring with a resistance to change calculated to absorb the shock of casting or a fish strike without straightening to the extent which would allow the bait to be pulled free.

5. An apparatus for securing a lure to a hook as defined in claim 1, wherein the wire from which said helix is made has a resiliency which causes said helix to function as both a compression and expansion spring with a resistance to change calculated to absorb the shock of casting or a fish strike to preclude the elastic deformation of the bait material caused by said shocks from bearing against the wire of said helix with a cutting force and without straightening to the extent which would allow the bait to be pulled free.

6. An apparatus for securing a lure to a hook as defined in claim 1, wherein the wire from which said helix is made has a resiliency which causes said helix to function as both a compression and expansion spring with a resistance to change approximately equal to the elasticity of the artificial bait material with which it is to be used.

7. An apparatus for securing a lure to a hook as defined in claim 1, wherein said means for securing said helix to the eye of said hook includes a spring clip comprising a section of wire adjacent to the end coil of said helix opposite the open coil termination end, said adjacent section of wire spaced from said end coil by a distance less than the diameter of the hook eye wire but wide enough to permit the elastic deformation of the spring clip to permit forcing the hook eye wire there through.

8. An apparatus for securing a lure to a hook as defined in claim 1, wherein said bent termination of a section of said wire extending from the coupling end of said helix opposite said open termination of said helix is formed in a U shape with a radius of curvature of the inner bottom of the U being greater than the radius of the hook eye wire of said hook and the distance between the sides of the U at at least one point being less than the diameter of said hook eye wire.

9. An apparatus for securing a lure to a hook as defined in claim 8, wherein one side of said U is bowed toward the other side.

10. An apparatus for securing a lure to a hook as defined in claim 8, wherein both sides of said U are bowed toward each other.

11. An apparatus for securing a lure to a hook as defined in claim 1, wherein said means for securing said helix to the eye of said hook includes; a spring clip comprising a section of wire adjacent to the end coil of said helix opposite the open coil termination end; said adjacent section of wire spaced from said end coil by a distance less than the diameter of the hook eye wire of said hook but wide enough to permit the elastic deformation of the spring clip to permit forcing said hook eye wire there through; and said bent termination of a section of said wire extending from the coupling end of said helix opposite said open termination of said helix is formed in a U shape with a radius of curvature of the inner bottom of the U being greater than the radius of said hook eye wire and the distance between the sides of the U at at least one point being less than the diameter of said hook eye wire.

12. An apparatus for securing a lure to a hook, comprising:
a cylindrical helix made of wire with all adjacent coils spaced apart made by a uniform distance greater than the diameter of the forming filament, said wire having a resiliency which causes said helix to function as both a compression and expansion spring with a resistance to change calculated to absorb the shock of casting or a fish strike to preclude the elastic deformation of the bait material caused by said shocks from bearing against the wire of said helix with a cutting force and without straightening to the extent which would allow the bait to be pulled free;
means for enabling said helix to be screwed into said lure, comprising an open termination of said helix created by an unattached end of said wire forming said helix cut at an angle to provide a bait cutting edge;
means for securing said helix to the eye of said hook said securing means including a bent termination of a section of said wire extending from the first coil of said helix at the end of said helix opposite said open termination of said helix;
a transition section of wire between said bent termination and the beginning of said first coil of said helix, said transition section of wire formed to create a wire section not within the plane of the coils of said helix;
a spring clip comprising a section of wire adjacent to said first coil of said helix;
said adjacent section of wire spaced from said first coil by a distance less than the diameter of the hook eye wire of said hook but wide enough to permit the elastic deformation of the spring clip to permit forcing said hook eye wire there through; and
said bent termination forming a U shape with a radius of curvature of the inner bottom of the U being greater than the radius of said hook eye wire and the distance between the sides of the U at least one point being less than the diameter of said hook eye wire.

13. An apparatus for securing a lure to a hook, comprising:
a cylindrical helix fabricated from a filament with all adjacent coils spaced apart by a uniform distance greater than the diameter of the forming filament;
means for enabling said helix to be screwed into said lure, comprising an open termination of said helix created by an unattached end of said filament forming said helix; and
means for securing said helix to the eye of said hook, said securing means including a bent termination of a section of said filament extending from the coupling end of said helix opposite said open termination of said helix.

14. An appartaus for securing a lure to a hook as defined in claim 13, further comprising:
a transition section of filament between said bent termination and the beginning of the first coil of said helix, said transition section of filament formed to create a filament section not within the plane of the coils of said helix.

15. An apparatus for securing a lure to a hook as defined in claim 13, wherein the filament from which said helix is made has a resiliency which causes said helix to function as both a compression and expansion spring with a resistance to change calculated to absorb the shock of casting or fish strike to preclude the elastic deformation of the bait material caused by said shocks from bearing against the filament of said helix with a cutting force.

16. An apparatus for securing a lure to a hook as defined in claim 13, wherein the filament from which said helix is made has a resiliency which causes said helix to function as both a compression and expansion spring with a resistance to change calculated to absorb the shock of casting or a fish strike without straightening to the extent which would allow the bait to be pulled free.

17. An apparatus for securing a lure to a hook as defined in claim 13, wherein the filament from which said helix is made has a resiliency which causes said helix to function as both a compression and expansion spring with a resistance to change calculated to absorb the shock of casting or a fish strike to preclude the elastic deformation of the bait material caused by said shocks from bearing against the filament of said helix with a cutting force and without straightening to the extent which would allow the bait to be pulled free.

18. An apparatus for securing a lure to a hook as defined in claim 13, wherein the filament from which said helix is made has a resiliency which causes said helix to function as both a compression and expansion spring with a resistance to change approximately equal to the elasticity of the artificial bait material with which it is to be used.

19. An apparatus for securing a lure to a hook as defined in claim 13, wherein said means for securing said helix to the eye of said hook includes a spring clip comprising a section of filament adjacent to the end coil of said helix opposite the open coil termination end, said adjacent section of filament spaced from said end coil by a distance less than the diameter of the hook eye wire but wide enough to permit the elastic deformation of the spring clip to permit forcing the hook eye wire there through.

20. An apparatus for securing a lure to a hook as defined in claim 13, wherein said bent termination of a section of said filament extending from the coupling end of said helix opposite said open termination of said helix is formed in a U shape with a radius of curvature of the inner bottom of the U being greater than the radius of the hook eye wire of said hook and the distance between the sides of the U at least one point being less than the diameter of said hook eye wire.

21. An apparatus for securing a lure to a hook as defined in claim 20, wherein one side of said U is bowed toward the other side.

22. An apparatus for securing a lure to a hook as defined in claim 20, wherein both sides of said U are bowed toward each other.

23. An apparatus for securing a lure to a hook as defined in claim 13, wherein said means for securing said helix to the eye of said hook includes; a spring clip comprising a section of filament adjacent to the end coil of said helix opposite the open coil termination end; said adjacent section of filament spaced from said end coil by a distance less than the diameter of the hook eye wire of said hook but wide enough to permit the elastic deformation of the spring clip to permit forcing said hook eye wire there through; and said bent termination of a section of said filament extending from the coupling end of said helix opposite said open termination of said helix is formed in a U shape with a radius of curvature of the inner bottom of the U being greater than the radius of said hook eye wire and the distance between the sides of the U at at least one point being less than the diameter of said hook eye wire.

24. An apparatus for securing a lure to a hook, comprising:
- a cylindrical helix made of wire with all adjacent coils spaced apart by a uniform distance greater than the diameter of the forming wire made from a filament with a resiliency which causes said helix to function as both a compression and expansion spring with a resistance to change calculated to absorb the shock of casting or a fish strike to preclude the elastic deformation of the bait material caused by said shocks from bearing against the filament of said helix with a cutting force and without straightening to the extent which would allow the bait to be pulled free;
- means for enabling said helix to be screwed into said lure, comprising an open termination of said helix created by an unattached end of said filament forming said helix cut at an angle to provide a bait cutting edge;
- means for securing said helix to the eye of said hook, said securing means including a bent termination of a section of said filament extending from the first coil of said helix at the end of said helix opposite said open termination of said helix;
- a transition section of filament between said bent termination and the beginning of said first coil of said helix, said transition section of filament formed to create a filament section not within the plane of the coils of said helix;
- a spring clip comprising a section of filament adjacent to said first coil of said helix;
- said adjacent section of filament spaced from said first coil by a distance less than the diameter of the hook eye wire of said hook but wire enough to permit the elastic deformation of the spring clip to permit forcing said hook eye wire there through; and said bent termination forming a U shape with a radius of curvature of the inner bottom of the U being greater than the radium of said hook eye wire and the distance between the sides of the U at at least one point being less than the diameter of said hook eye wire.

* * * * *